Patented Nov. 17, 1925.

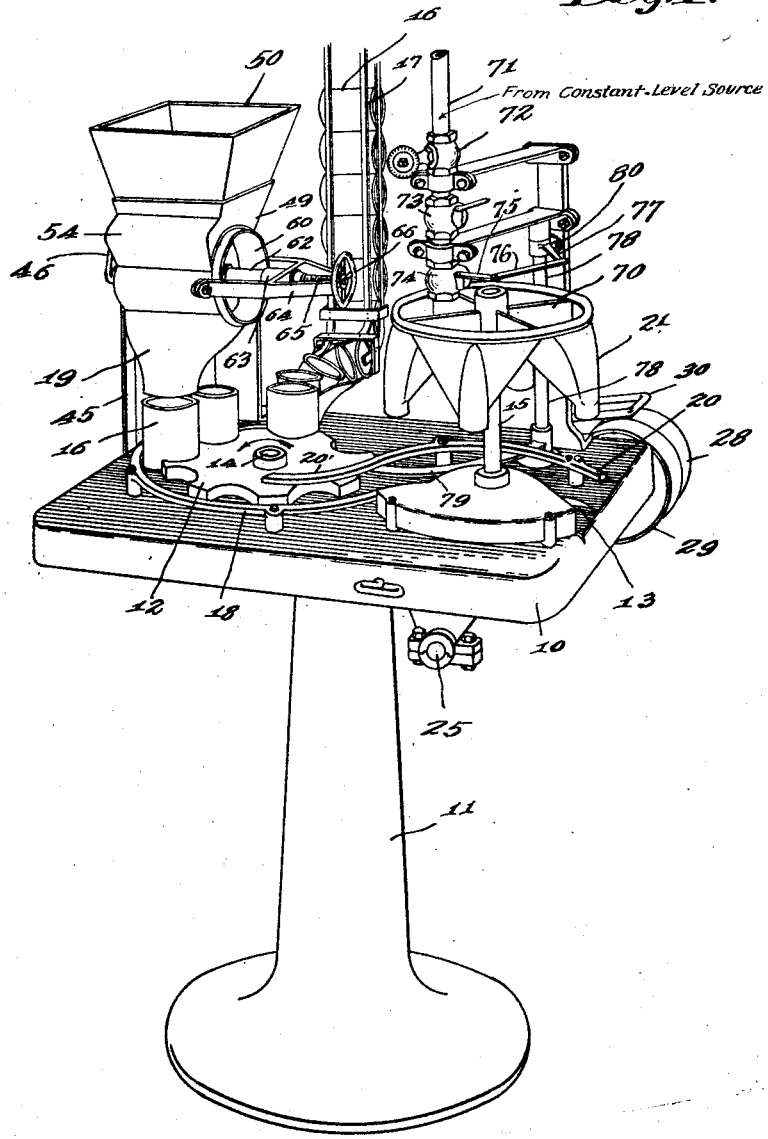

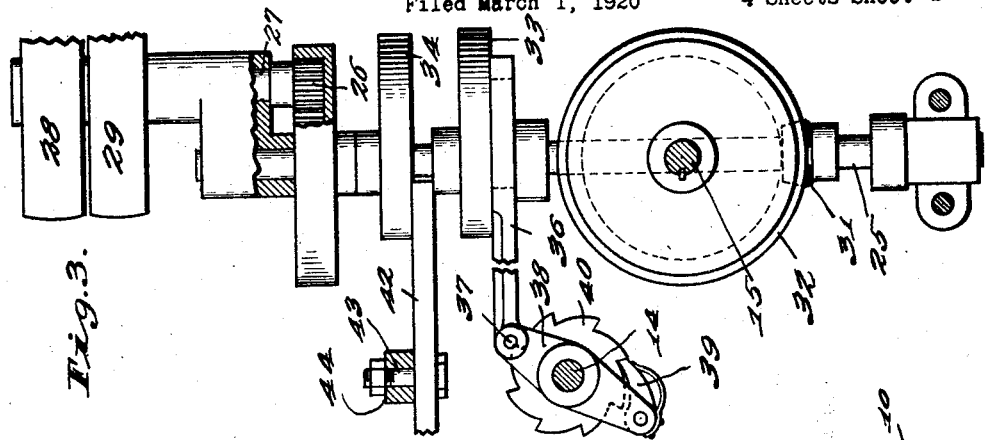

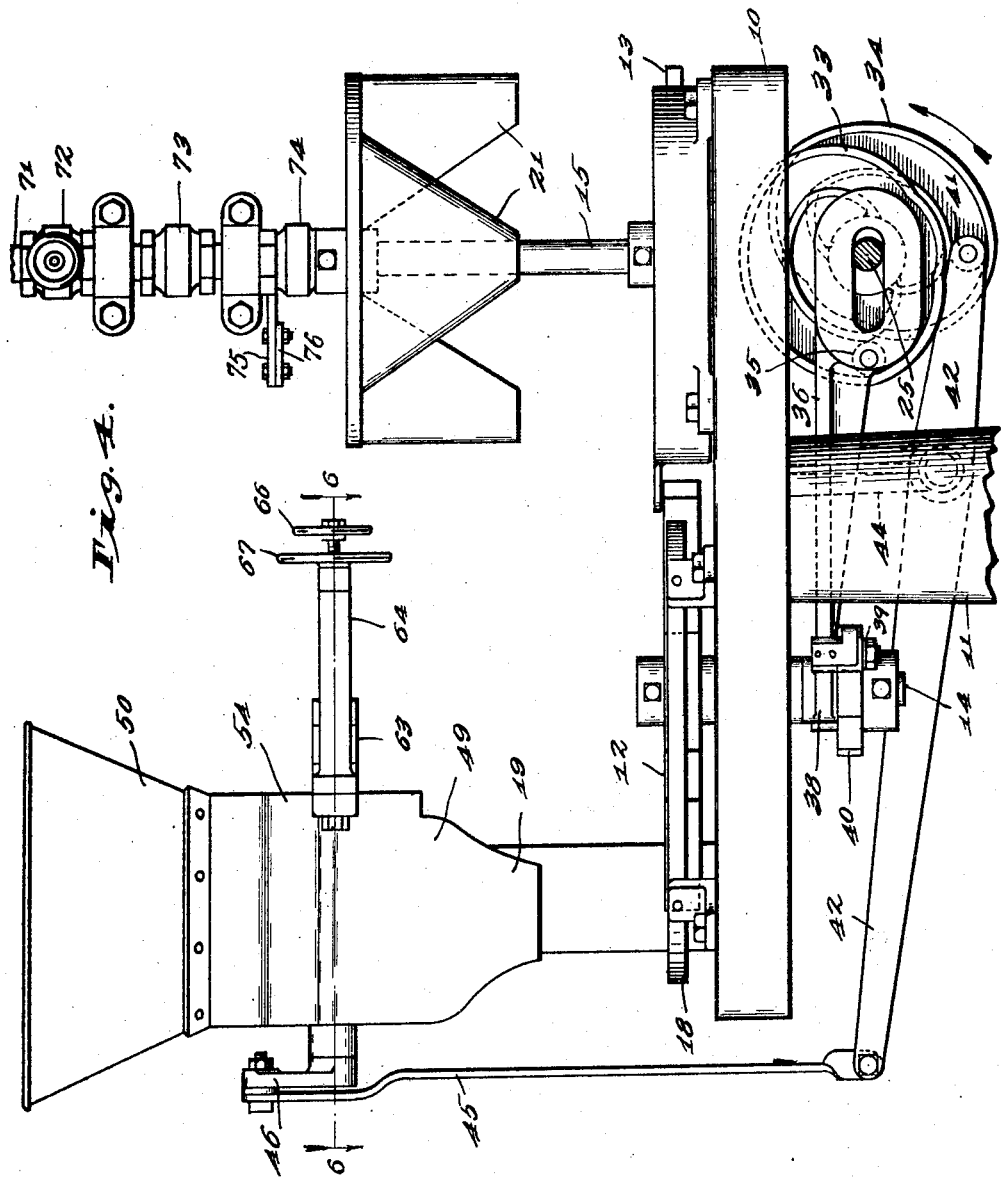

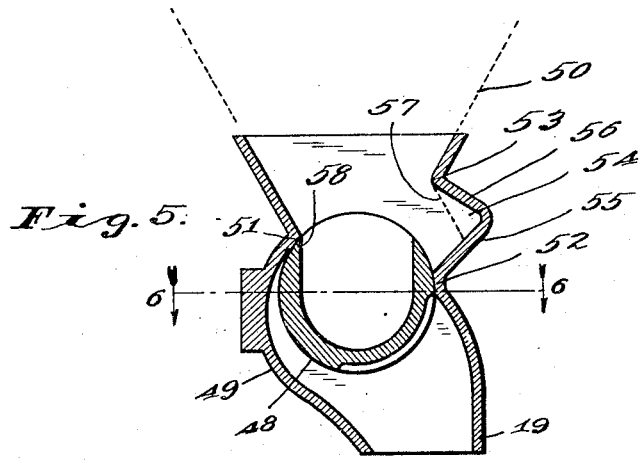
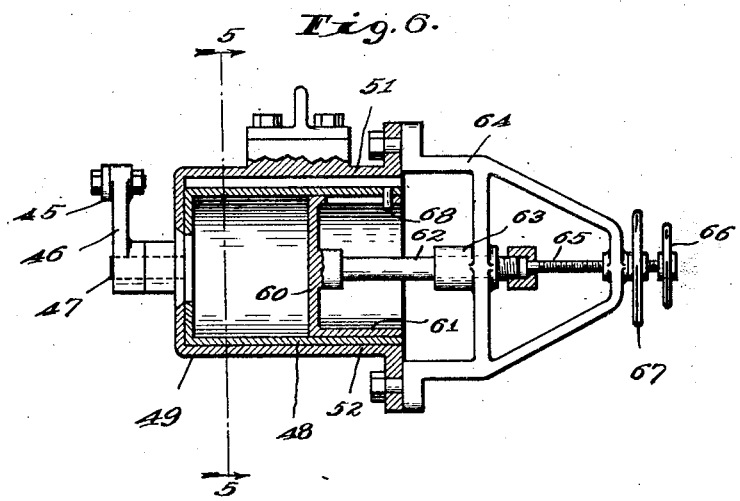

1,561,939

UNITED STATES PATENT OFFICE.

HARRY W. LOWE, DECEASED, LATE OF INDIANAPOLIS, INDIANA; BY MARK W. LOWE, ADMINISTRATOR, OF BUFFALO, NEW YORK.

MEASURING AND FILLING DEVICE.

Application filed March 1, 1920. Serial No. 362,589.

*To all whom it may concern:*

Be it known that HARRY W. LOWE, deceased, who before his death was a citizen of the United States, residing in Indianapolis, in the county of Marion and State of Indiana, invented a new and useful Measuring and Filling Device, of which the following is a specification.

It is the object of the present invention to provide a measuring and filling arrangement for filling cans, especially for filling cans with food stuffs though also for other purposes; and further, to handle both liquids and solids through separate but associated measuring devices either one of which may be used independently, whereby the solids will be measured and fed into the can without damage as from crushing, and the liquid will be fed into the can without dripping; and to do all this automatically.

The accompanying drawings illustrate the invention: Fig. 1 is a perspective view of a filling and measuring device embodying my invention; Fig. 2 is a horizontal section taken on a plane somewhat above the table and can-moving parts but below the solids- and liquid-feeding parts; Fig. 3 is a horizontal section just below the table, with some parts broken away, to show the operating mechanism; Fig. 4 is an elevation of the structure, with the pedestal broken away; Fig. 5 is a vertical section on the line 5—5 of Fig. 6, showing the solids-feeding device; and Fig. 6 is a section on the lines 6—6 of Figs. 4 and 5.

The device as shown has a horizontal table 10 suitably supported as on a pedestal 11; and above this table are two oppositely rotating star wheels 12 and 13 carried by vertical shafts 14 and 15 extending through the table 10 and driven from below the table in the manner hereinafter described to produce rotation of such star wheels in the directions indicated by the arrows in Fig. 2— the star wheel 12 counterclockwise and the star wheel 13 clockwise. The star wheel 12 receives cans 16 to be filled, receiving them from a can chute 17 (Fig. 1) which deposits the cans with the open end upward in position to be received by one of the notches of the star wheel 12; and this star wheel is intermittently operated to carry the cans in an arc-shaped path of movement in contact with a curved guide 18, allowing each can to stop below the discharge spout 19 of the solids-feeding device for a sufficient time for such can to receive its allotted amount of solids. The star wheel 12 in its rotation discharges the cans 16, now containing their solids, to the star wheel 13 which carries them with a continuous movement through a reverse arc-shaped path against a guide 20 which at its receiving end has a projecting portion 20' which guides the cans containing their solids from their position in the notches of the star wheel 12 into position to be acted upon by the fingers of the star wheel 13. As the cans are carried forward by the star wheel 13 they receive their allotted supply of liquid from one or another of the circular series of rotating liquid-feeding funnels 21 which are carried by the shaft 15 to rotate therewith. After receiving their supply of liquid the cans are discharged from the star wheel 13 onto any suitable receiving or conveying mechanism with which the present invention is not concerned.

In order to operate the star wheels 12 and 13 as stated there is a main driving shaft 25 extending horizontally below the table 10 and connected by a suitable gearing 26, as shown an internal gear and a spur pinion, to a power shaft 27 on which there are fast and loose pulleys 28 and 29, with suitable belt-shifting mechanism 30 for starting and stopping the shafts 25 and 27 in the usual manner. The shaft 25 carries a bevel pinion 31 meshing with a bevel gear 32 fixed on the shaft 15 below the table 10, so that when the shaft 25 rotates it produces continuous rotation of the shaft 15 and of the parts carried thereby—the star wheel 13 and the liquid-feeding funnels 21.

The shaft 25 also carries two cams 33 and 34, each of which has a cam groove in one end face. A roller 35 carried by a slide bar 36 having a sliding mounting on the shaft 25 travels in the cam groove in the cam 33, to move such slide bar 36 backward and forward approximately horizontally transverse to the shaft 15 as the latter rotates. The end of this slide bar 36 has a loose pivot connection 37 to a cross-bar 38 mounted on the shaft 14, which cross-bar 38 carries a spring-pressed pawl 39 co-operating with a ratchet wheel 40 fixed on the shaft 15 below the table 10. The mounting of the slide bar 36 and its connection to the cross-bar 38 are sufficiently loose so that the movement of such slide bar is not interfered with in spite of the fact that its movement is not confined to a single plane. Thus as the shaft 25 rotates, the slide bar 36 is reciprocated to oscillate the cross-bar 38, and through the pawl-and-ratchet connection 39—40 to feed the star wheel 12 intermittently forward. The cam groove in the cam 33 is of the proper shape to produce this movement.

The cam 34 is similar to the cam 33, but angularly displaced therefrom on the shaft 25. A roller 41 travels in its cam groove, and this roller is carried by one end of a lever 42 pivotally mounted on a pivot pin 43 carried by a downwardly projecting finger 44 from the table 10, or otherwise suitably supported. The opposite end of the lever 42 is connected by a loose-jointed link 45 to a crank arm 46 fixed on the projecting horizontal trunnion 47 from the closed end of a cylindrical measurer 48 located in a casing 49, which casing below such measurer 48 leads to the solids spout 19 and above such measurer to the feed hopper 50 from which the measurer receives its supply of solids. Thus as the shaft 25 rotates, it rocks the lever 42, and oscillates the measurer back and forth to produce the measuring and feeding operation.

The measurer 49 is hollow and is open on one side, and this open side is alternately brought into communication with the hopper 50 to receive a charge of solids and into communication with the spout 19 to feed such charge to such spout, as such measurer is oscillated as aforesaid. The measurer 48 is cylindrical exteriorly, and bears against the casing 49 along the lower edge 51 of the rear wall of the hopper 50 and also along the front wall of such casing on the bearing surface 52, across which latter surface the open side of the measurer 48 travels during the oscillations of such measurer. The bearing surface 52 does not lead directly to the front wall of the hopper 50, but instead such front hopper wall ends some distance above such bearing surface 52, and between the lower end of such hopper wall and the bearing surface 52 there is an outwardly offset pocket 54 the lower wall 55 of which is preferably an oblique wall like the hopper wall and the upper wall 56 of which extends from the lower edge 53 of the front hopper wall horizontally forward at an angle which is materially nearer the horizontal than the angle of repose of any solids which are supplied to the hopper 50. As a result, the solids from the hopper 50 will project into the pocket 54 with a free oblique upper surface 57 (indicated in dotted lines) which is separated from the upper pocket wall 56, thus leaving a free space into which such solids may freely move in case they are caught and pushed upward by the descending edge 58 at the back of the open part of the measurer 48; thus, for instance, if the solids being fed are beans, and some of the beans are pushed back by the edge 58 as such edge passes into engagement with the bearing surface 52, these pushed-back beans merely require that a few beans above them enter the open space of the pocket 54, instead of requiring the lifting of the entire supply of beans in the hopper 50. This provision of the pocket 54 materially lessens the number of beans which are crushed in passing through the measuring device, and indeed practically eliminates any crushing of the beans whatsoever.

In order to vary the amount of solids discharged by the measurer 48 in an oscillation, the opposite end of such measurer from that which carries the trunnion 47 is open, and slidably mounted in this open end is a plunger 60 which is of the same cross-section as the opening within the measurer 48 so that by being slid longitudinally thereof it fills part of the space of the measurer and thereby varies the measuring space, which is the part which the plunger 60 does not fill. The plunger 60 is shown as hollow, with suitable side walls 61 for preventing the solids from the hopper 50 from entering that part of the measurer 48 which is to the right (Fig. 6) of the base of the plunger 60, the measuring space being that to the left of such plunger space. A plunger rod 62 extends from the plunger 60 through a suitable bearing 63 in a projecting frame 64 carried by the casing 49, which bearing 63 and rod 62 serve as the other supporting trunnion for the measurer 48. The rod 62 to the right of the bearing 63 (Fig. 6) is rotatably connected to a screw 65, mounted in a frame 64 and provided with a hand wheel 66 by which it may be operated to move the plunger 60 forward and back; and preferably there is a suitable locking nut and hand wheel 67 for locking the plunger in any position in which it may be set. The plunger 60 is guided in its movements along the axis of the measurer 48 by a pin-and-slot interconnection 68.

The liquid-feeding funnels 21 are equal in number to the fingers of the star wheel 13, and are separated from one another by radial webs 70 which form part of such funnels. Above the cylindrical series of funnels 21 in position to discharge into one which has just received a can 16 fully beneath it is a liquid-feeding pipe 71, for feeding the catsup or other liquid which is to be supplied in measured quantities to the cans which have already received their measured quantities of solids. This pipe 71 receives its supply from any suitable source, preferably a constant-level source. Controlling the discharge from the pipe 71, and in series with one another, are three valves 72, 73, and 74. One of these valves, say the valve 73, is a shut-off valve, which in its open and closed positions merely permits or prevents the passage of the liquid from the pipe 71; the amount of liquid passing one such valve is dependent upon the other valves. This valve is continuously open when the machine is operated, but is closed when the machine is stopped; otherwise it is untouched. The valve 72 is a regulating valve for regulating the quantity of liquid which is discharged into each passing funnel 21. By adjusting it, the amount of liquid so discharged may be made more or less as desired. By providing the shutoff valve 73, it is unnecessary to change the setting of the valve 72 when the machine is temporarily stopped, so that when the machine is again started and the valve 73 opened the quantity of liquid permitted to pass by the valve 72 will not have been changed. The valve 74 is an automatic valve, for letting liquid be discharged from the pipe into a funnel 21 only when a can 16 has been received beneath such funnel. To this end the operating arm 75 of the valve 74 is connected by a link 76 to an arm 77 fixed on a vertical shaft 78, on the lower end of which is fixed a finger 79. This finger 79 is arranged to be moved in one direction, to open the valve 74, by the cans 16 as they pass into the star wheel 13, a suitable spring 80 being arranged to act on the vertical shaft 78 to move it in the opposite direction to close the valve 74 when no can passes into a notch in the star wheel 13. Thus if for any reason any notch of the star wheel 13 does not receive a can, the funnel which is above that notch does not receive any liquid from the pipe 71, and so that funnel 21 does not discharge such liquid unless there is a can beneath it. This not only saves the liquid, but, which is more important, it prevents the discharge of the liquor onto the table 10 instead of into a can. When a can is received beneath a funnel 21, however, such funnel receives a supply of liquid through the now open valve 74, and feeds such liquid on into the can beneath it; and as the shaft 15 is rotated to carry the can forward by the action of the star wheel 13, the funnel 21 which is supplying such can moves forward with it until by the time the can leaves the star wheel 13 the liquid in the funnel 21 is wholly discharged into the can and even the dripping is stopped.

In operation, the star wheel 13 and funnels 21 are rotated continuously, the star wheel 12 is fed forward intermittently and allowed to remain stationary between forward movements, and the measurer 48 is oscillated. All these movements are properly timed, by the proper angular spacing of the cams 33 and 34 on the shaft 25 and by providing the proper ratio for the gearing 31—32. The can chute 17 is kept filled with cans and the hopper 50 with the desired solids; and the pipe 71 is kept supplied with the desired liquid, from any suitable source. As the machine operates, the star wheel 12 in its intermittent forward movement receives cans from the chute 17 and carries them forward, by the action of the cam 33 and the ratchet mechanism 39—40. Each can stops beneath the spout 19. While the can is beneath the spout 19, the measurer 48, which just previously has had its open side uppermost to receive a charge of solids, is inverted by the action of the cam 34 on the lever 42 to feed such charge through the spout 19 into the waiting can beneath; and after such charge has been received by the can, the measurer is returned to its receiving position while the filled can travels onward and an empty can takes its place beneath the spout 19. Crushing of the solids by the measurer 48 is prevented by the pocket 54, as already explained. As the star wheel 12 continues its rotation, it feeds the cans around the inside of the guide 18 and the star wheel 13, in which the cans are guided by the finger 20'. As each can 16 enters the star wheel 13, it passes to a position below one of the funnels 21. When a can passes to its position, it acts on the finger 79, to open the valve 74; which remains open for a sufficient time to permit a supply of the desired quantity of liquid, as determined by the setting of the valve 72, to the funnel 21 above such can. The star wheel 13 in its continuous rotation now carries the can forward, and during this forward movement the can receives from the funnel 21 above it the liquid which the latter has received from the pipe 71. Loss of liquid is prevented by the closing of the valve 74 in case a funnel 21 passes beneath the pipe 71 with no can 16 beneath it. The amounts of solids and liquids fed to each can are determined by the settings of the hand wheel 66 and of the valve 72.

I claim as his invention:

1. In a measuring and filling apparatus, two interconnected receptacle-moving devices, one being arranged to operate continuously and one intermittently, a stationary measuring device for measuring and discharging solids into successive receptacles while they are associated with the intermittent receptacle-moving device during the period when the latter is stationary, and a movable device for discharging measured quantities of liquid into successive receptacles while they are associated with the continuous receptacle-moving device, one of said receptacle-moving devices being arranged to feed receptacles to the other.

2. In a measuring and filling apparatus, two interconnected receptacle-moving devices, a stationary measuring device for measuring and discharging solids into successive receptacles while they are associated with one of said receptacle-moving devices, and a movable device for discharging measured quantities of liquid into successive receptacles while they are associated with the other of said receptacle-moving devices, one of said receptacle-moving devices being arranged to feed receptacles to the other.

3. In a measuring and filling apparatus, two interconnected receptacle-moving devices, a stationary measuring device for measuring and discharging solids into successive receptacles while they are associated with one of said receptacle-moving devices, a movable device for discharging measured quantities of liquid into successive receptacles while they are associated with the other of said receptacle-moving devices, one of said receptacle-moving devices being arranged to feed receptacles to the other, and means for preventing the discharge of liquid by said movable device unless there is a receptacle in proper position to receive such discharge.

4. In a measuring and filling apparatus, the combination of a table, two star wheels associated therewith for moving receptacles thereover, one of said star wheels being arranged to discharge receptacles to the other, a stationary measuring device operated in time with one of said star wheels and arranged to discharge solids into receptacles associated with said star wheel, a rotating funnel movable with the other star wheel and arranged to discharge into a receptacle associated with such star wheel while such star wheel is moving, and means for discharging a measured quantity of liquid into said rotating funnel.

5. In a measuring and filling apparatus, the combination of a table, two star wheels associated therewith for moving receptacles thereover, a stationary measuring device operated in time with one of said star wheels and arranged to discharge solids into receptacles associated with said star wheel, a rotating funnel movable with the other star wheel and arranged to discharge into a receptacle associated with such star wheel while such star wheel is moving, means for discharging a measured quantity of liquid into said rotating funnel, and means associated with said star wheels for causing receptacles supplied to one of them to remain in cooperation therewith while one measured quantity is being discharged thereinto and then to pass to the other star wheel and remain in cooperation therewith while the other measured quantity is being discharged thereinto.

6. In a measuring and filling apparatus, the combination of a table, two star wheels associated therewith for moving receptacles thereover, a stationary measuring device operated in time with one of said star wheels and arranged to discharge solids into receptacles associated with said star wheel, that star wheel having an intermittent movement and being stationary during the time the associated receptacle receives such discharge, a rotating funnel movable with the other star wheel and arranged to discharge into a receptacle associated with such star wheel while such star wheel is moving, means for discharging a measured quantity of liquid into said rotating funnel, and means associated with said star wheels for causing receptacles supplied to one of them to remain in cooperation therewith while one measured quantity is being discharged thereinto and then to pass to the other star wheel and remain in cooperation therewith while the other quantity is being discharged thereinto.

7. In a measuring and filling apparatus, the combination of a table, two star wheels associated therewith for moving receptacles thereover, a stationary measuring device operated in time with one of said star wheels and arranged to discharge solids into receptacles associated with said star wheel, a rotating funnel movable with the other star wheel and arranged to discharge into a receptacle associated with such star wheel while such star wheel is moving, means for discharging a measured quantity of liquid into said rotating funnel, means for preventing the discharge of liquid into said funnel save when a receptacle is in a position to receive the discharge of liquid from the funnel, and means associated with said star wheels for causing receptacles supplied to one of them to remain in cooperation therewith while one measured quantity is being discharged thereinto and then to pass to the other star wheel and remain in cooperation therewith while the other measured quantity is being discharged thereinto.

8. In a measuring and filling apparatus for liquids, a receptacle-moving device, a funnel movable with said device and arranged to discharge into a receptacle associated with said device as such receptacle is moving, a pipe arranged to discharge into said funnel at a certain point in the movement thereof, a valve in said pipe, said valve being spring-pressed to closed position, and means for opening said valve upon the movement of a receptacle into association with said receptacle-moving device.

9. In a measuring and filling apparatus for liquids, a receptacle-moving device, a funnel movable with said device and arranged to discharge into a receptacle associated with said device as such receptacle is moving, and a pipe arranged to discharge into said funnel at a certain point in the movement thereof, said pipe being provided with three valves therein in series, one being a shut-off valve, another being an adjusting valve, and the third being a valve controlled by the movement of the receptacles into association with said device.

10. In a measuring and filling apparatus for liquids, a receptacle-moving device, a funnel movable with said device and arranged to discharge into a receptacle associated with said device as such receptacle is moving, and a pipe arranged to discharge into said funnel at a certain point in the movement thereof, said pipe being provided with three valves therein in series, one being a shut-off valve, another being an adjusting valve, and the third being a valve controlled by the movement of the receptacles into association with said device, said last-named valve being spring-pressed to closed position and being arranged to be moved to open position by the movement of a receptacle into association with said device.

11. In a measuring and filling apparatus for liquids, the combination of a liquid-discharging pipe, a receptacle-moving device for moving receptacles through a predetermined path during which they receive liquid from said pipe, and three valves in said pipe in series, one of said valves being a shut-off valve, another being an adjusting valve, and the third being arranged to be controlled by the movement of a receptacle into association with said receptacle-moving device.

12. In a measuring and filling apparatus for liquids, the combination of a table, a rotatable star wheel movable thereover, a circular series of funnels movable with said star wheel, each of said funnels being arranged over a notch in said star wheel to discharge into a receptacle in said notch as said receptacle is being moved by the star wheel, and a liquid-discharge pipe beneath which successive funnels pass to receive a supply of liquid therefrom, a controlling valve in said liquid-discharge pipe, said controlling valve being spring-pressed to closed position, and means for opening said controlling valve upon the movement of a receptacle into the notches of said star wheel.

In witness whereof, I have hereunto set my hand at Buffalo, New York, this 25th day of February, 1920.

MARK W. LOWE,
*Administrator of the Estate of*
*Harry W. Lowe, Deceased.*